(12) United States Patent
Jung et al.

(10) Patent No.: US 11,275,484 B2
(45) Date of Patent: Mar. 15, 2022

(54) METHOD OF CONTROLLING DEVICE HAVING PLURALITY OF OPERATING SYSTEMS INSTALLED THEREIN, AND THE DEVICE

(71) Applicant: SAMSUNG ELECTRONICS CO., LTD., Suwon-si (KR)

(72) Inventors: Gi-hun Jung, Seoul (KR); Jung-hyun Yoo, Seoul (KR); Min-ji Lee, Suwon-si (KR); Sung-min Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 139 days.

(21) Appl. No.: 15/686,433

(22) Filed: Aug. 25, 2017

(65) Prior Publication Data

US 2017/0371509 A1 Dec. 28, 2017

Related U.S. Application Data

(63) Continuation of application No. PCT/KR2016/001919, filed on Feb. 26, 2016.

(Continued)

(51) Int. Cl.
*G06F 3/0481* (2013.01)
*G06F 3/0486* (2013.01)
(Continued)

(52) U.S. Cl.
CPC ......... *G06F 3/0482* (2013.01); *G06F 3/0486* (2013.01); *G06F 3/04817* (2013.01); *G06F 9/445* (2013.01); *G06F 9/451* (2018.02)

(58) Field of Classification Search
CPC .. G06F 3/0482; G06F 3/04817; G06F 3/0486; G06F 9/445; G06F 9/451
See application file for complete search history.

(56) References Cited

U.S. PATENT DOCUMENTS 8,786,780 B2 7/2014 Kurosaki
8,863,120 B2 10/2014 Tsai et al.
(Continued)

FOREIGN PATENT DOCUMENTS

CN 102801851 A 11/2012
CN 104239142 A 12/2014
(Continued)

OTHER PUBLICATIONS

Communication dated May 27, 2016 issued by the International Searching Authority in counterpart International Application PCT/KR2016/001919 (PCT/ISA/210/237).
(Continued)

*Primary Examiner* — Jennifer N Welch
*Assistant Examiner* — Amy P Hoang
(74) *Attorney, Agent, or Firm* — Sughrue Mion, PLLC

(57) ABSTRACT

Provided is a method of operating a device having a plurality of operating systems installed therein, the method including: receiving a first user input for selecting at least one application installed in a first operating system among the plurality of operating systems; receiving a second user input for selecting a second operating system, in which a shortcut icon for execution of the selected application is to be displayed, among the plurality of operating systems; creating the shortcut icon based on the first user input and the second user input; and displaying the created shortcut icon on a user interface of the second operating system.

11 Claims, 17 Drawing Sheets

Related U.S. Application Data

(60) Provisional application No. 62/121,923, filed on Feb. 27, 2015.

(51) Int. Cl.
*G06F 3/0482* (2013.01)
*G06F 9/451* (2018.01)
*G06F 3/04817* (2022.01)
*G06F 9/445* (2018.01)

(56) References Cited

U.S. PATENT DOCUMENTS

| | | | |
|---|---|---|---|
| 8,869,074 B2 | 10/2014 | Lim et al. | |
| 8,890,805 B2 | 11/2014 | Kwon et al. | |
| 8,910,163 B1 | 12/2014 | Grechishkin et al. | |
| 9,178,981 B2 | 11/2015 | Cho et al. | |
| 9,442,743 B2 | 9/2016 | Kim et al. | |
| 2012/0110496 A1* | 5/2012 | Lee | G06F 3/0488 715/778 |
| 2012/0180049 A1 | 7/2012 | Tsai et al. | |
| 2012/0309464 A1* | 12/2012 | Lim | H04M 1/72522 455/566 |
| 2013/0298141 A1* | 11/2013 | Wolfe | G09G 5/14 719/319 |
| 2014/0137100 A1* | 5/2014 | Won | G06F 8/61 717/176 |
| 2014/0344757 A1* | 11/2014 | Shin | G06F 3/04842 715/835 |
| 2014/0365971 A1* | 12/2014 | Laadan | G06F 3/0482 715/835 |
| 2015/0205456 A1* | 7/2015 | Ji | G06F 3/0481 715/847 |
| 2017/0185461 A1* | 6/2017 | Ye | G06F 3/0481 |

FOREIGN PATENT DOCUMENTS

| | | |
|---|---|---|
| EP | 2 530 922 A1 | 12/2012 |
| JP | 2013-140516 A | 7/2013 |
| KR | 10-2011-0085767 A | 7/2011 |
| KR | 10-2012-0089985 A | 8/2012 |
| KR | 10-2012-0133777 A | 12/2012 |
| KR | 10-2013-0013371 A | 2/2013 |
| KR | 10-2014-0144562 A | 12/2014 |
| WO | 2013/124850 A1 | 8/2013 |

OTHER PUBLICATIONS

Communication dated May 27, 2020, from The China National Intellectual Property Administration in Application No. 201680012210.X.

Communication dated Mar. 1, 2021 issued by the China National Intellectual Property Administration in Chinese Application No. 201680012210.X.

Communication dated Jun. 9, 2021, from the China National Intellectual Property Administration in Chinese Application No. 201680012210.X.

Communication dated Nov. 3, 2021 by the China National Intellectual Property Administration in Chinese Patent Application No. 201680012210.X.

* cited by examiner

METHOD OF CONTROLLING DEVICE HAVING PLURALITY OF OPERATING SYSTEMS INSTALLED THEREIN, AND THE DEVICE

TECHNICAL FIELD

Embodiments described herein relate to a method of controlling a device having a plurality of operating systems installed therein, a device having a plurality of operating systems installed therein, and a recording medium storing a program for performing a method of controlling a device having a plurality of operating systems installed therein.

BACKGROUND ART

An operating system (OS) refers to a program that controls software and hardware of a computer to allow a user to use the computer. The operating system may manage computer resources such as a central processing unit (CPU), a main memory device, and an input/output device while functioning as an interface between the hardware and an application program.

Recently, as users have expected more use of various computing environments according to their purposes or requirements, attempts to develop a technology for driving two or more operating systems in one device have increased. Accordingly, there is an increasing need to develop a user interface that may provide an easier environment for a user to selectively execute an application installed in a plurality of operating systems according to his/her requirements when a plurality of operating systems are driven in a device.

DETAILED DESCRIPTION OF THE INVENTION

Technical Problem

Embodiments described herein provide a method of controlling a device having a plurality of operating systems installed therein, in which execution information of an application installed in any one of the plurality of operating systems installed in the device is provided to a user interface of another operating system, thereby allowing a user to easily use the application installed in the device.

Technical Solution

Provided is a method of controlling a device having a plurality of operating systems installed therein, the method including: receiving a first user input for selecting at least one application installed in a first operating system among the plurality of operating systems; receiving a second user input for selecting a second operating system, in which a shortcut icon for execution of the selected application is to be displayed, among the plurality of operating systems; creating the shortcut icon based on the first user input and the second user input; and displaying the created shortcut icon on a user interface of the second operating system.

BEST MODE

Figure 1:
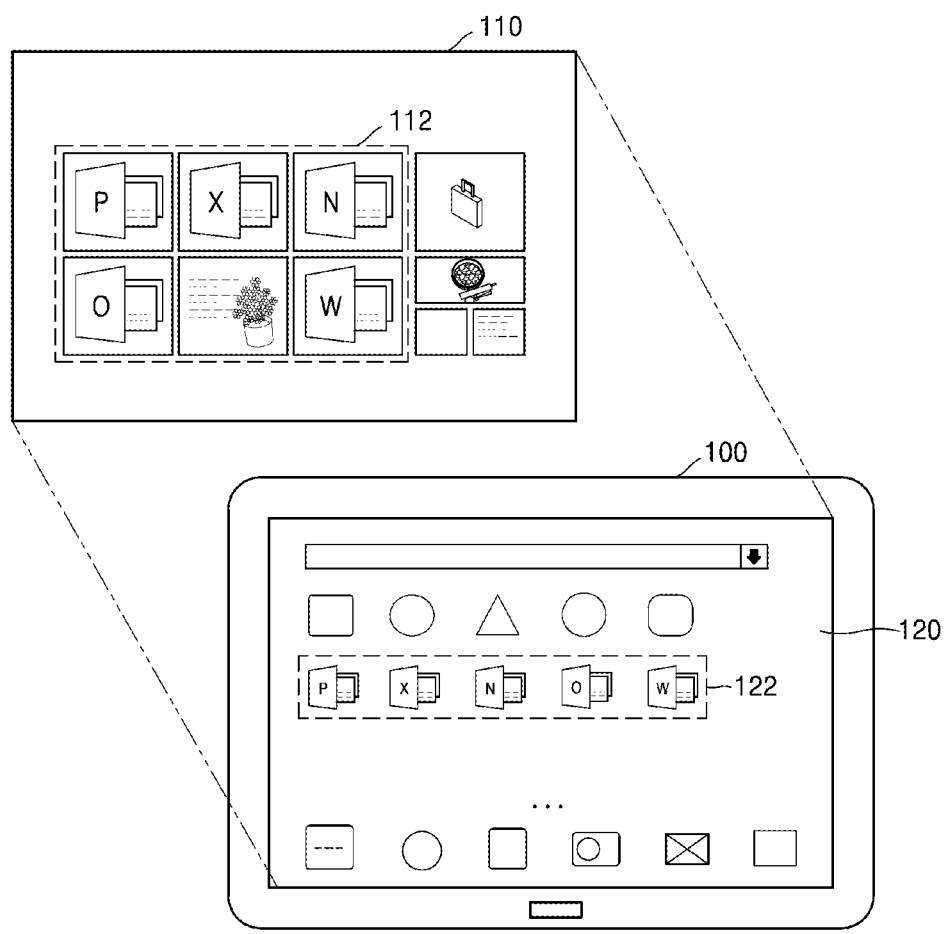
FIG. 1 is a conceptual diagram illustrating a method of controlling a device having a plurality of operating systems installed therein according to an embodiment.

According to an embodiment, a method of controlling a device having a plurality of operating systems installed therein includes: receiving a first user input for selecting at least one application installed in a first operating system among the plurality of operating systems; receiving a second user input for selecting a second operating system, in which a shortcut icon for execution of the selected application is to be displayed, among the plurality of operating systems; creating the shortcut icon based on the first user input and the second user input; and displaying the created shortcut icon on a user interface of the second operating system.

The method may further include selecting a preset application among the at least one application installed in the first operating system according to the receiving of the first user input, wherein the creating of the shortcut icon may include creating a shortcut icon of each of the selected preset application.

The method may further include: displaying a list including identification information about a plurality of applications installed in the first operating system; and selecting, based on the first user input, the at least one application among the plurality of applications displayed in the list.

The method may further include selecting the at least one application according to the receiving of the first user input on an icon of the at least one application displayed on a user interface of the first operating system.

The method may further include: displaying a list including identification information about the plurality of operating systems; and selecting the second operating system based on the second user input received on the list.

The creating of the shortcut icon may include creating a shortcut icon about the at least one application according to the receiving of the first user input for selecting an icon of the at least one application displayed on a user interface of the first operating system and the second user input for dragging the selected icon on the user interface of the second operating system.

The creating of the icon may include creating path information for accessing a position at which the selected at least one application is installed in the first operating system and identification information of the selected at least one application.

An identifier representing the first operating system, in which the application corresponding to the shortcut icon is installed, may be displayed on the shortcut icon.

The displaying may include classifying and displaying a plurality of shortcut icons displayed on the user interface of the second operating system according to the types of operating systems.

The method may further include removing the shortcut icon from the user interface of the second operating system according to removal of the at least one application from the first operating system.

According to an embodiment, a device having a plurality of operating systems installed therein includes: a user input unit configured to receive a first user input for selecting at least one application installed in a first operating system among the plurality of operating systems, and receive a second user input for selecting a second operating system, in which a shortcut icon for execution of the selected application is to be displayed, among the plurality of operating systems; a control unit configured to create the shortcut icon based on the first user input and the second user input and display the created shortcut icon on a user interface of the second operating system; and an output unit configured to display the user interface of the second operating system.

The control unit may select a preset application among the at least one application installed in the first operating system according to the receiving of the first user input and create a shortcut icon of each of the selected preset application.

The output unit may display a list including identification information about a plurality of applications installed in the first operating system; and the control unit may select the at least one application among the plurality of applications displayed in the list based on the first user input.

The control unit may select the at least one application according to the receiving of the first user input on an icon of the at least one application displayed on a user interface of the first operating system.

The output unit may display a list including identification information about the plurality of operating systems; and the control unit may select the second operating system based on the second user input received on the list.

The control unit may create a shortcut icon about the at least one application according to the receiving of the first user input for selecting an icon of the at least one application displayed on a user interface of the first operating system and the second user input for dragging the selected icon on the user interface of the second operating system.

The control unit may create path information for accessing a position at which the selected at least one application is installed in the first operating system and identification information of the selected at least one application.

An identifier representing the first operating system, in which the application corresponding to the shortcut icon is installed, may be displayed on the shortcut icon.

The output unit may classify and display a plurality of shortcut icons displayed on the user interface of the second operating system according to the types of operating systems.

The control unit may remove the shortcut icon from the user interface of the second operating system according to removal of the at least one application from the first operating system.

MODE OF THE INVENTION

Terms used herein will be described in brief before the detailed description of embodiments.

As the terms used herein, so far as possible, widely-used general terms are selected in consideration of functions in the embodiments; however, these terms may vary according to the intentions of those skilled in the art, the precedents, or the appearance of new technology. Also, in some cases, there may be terms that are optionally selected by the applicant, and the meanings thereof will be described in detail in the corresponding portions of the description of the inventive concept. Therefore, the terms used herein are not simple terms and should be defined based on the meanings thereof and the overall description of the inventive concept.

Throughout the specification, when something is referred to as "including" a component, another component may be further included unless specified otherwise. Also, as used herein, the terms "units" and "modules" may refer to units that perform at least one function or operation, and the units may be implemented as hardware or software or a combination of hardware and software.

Hereinafter, embodiments of the inventive concept will be described in detail with reference to the accompanying drawings so that those of ordinary skill in the art may easily implement the embodiments. However, the inventive concept may be embodied in many different forms and should not be construed as being limited to the embodiments set forth herein. In addition, portions irrelevant to the description of the embodiments will be omitted in the drawings for a clear description of the embodiments, and like reference numerals will denote like elements throughout the specification.

Devices described herein may include, for example, digital TVs, desktop computers, mobile phones, smart phones, tablet PCs, notebook computers (laptop computers), digital broadcasting terminals, personal digital assistants (PDAs), portable multimedia players (PMPs), and navigation devices.

An operating system (OS) refers to a program that controls the software and hardware of a device to allow a user to use the device. The operating system may manage computer resources such as a central processing unit (CPU), a main memory device, and an input/output device while functioning as an interface between the hardware and an application program. Types of the operating system may include, for example, Android, Windows, Mac, Tizen, Unix, and Linux.

An application refers to software that is developed to allow the user to perform a particular operation by using the device. The application may include instructions that are necessary to perform a particular operation. Herein, the instructions constituting the application may be different from each other according to the types of operating systems. Examples of the application may include an e-mail application, a messenger application, a schedule management application, and a text editing application. Also, herein, the application may include data resulting from performing a particular operation by using the software, and a file that is a set of data. For example, the text editing application may include a text file that is created by the user by using the text editing application.

Hereinafter, the inventive concept will be described in detail with reference to the accompanying drawings.

FIG. 1 is a conceptual diagram illustrating a method of controlling a device 100 having a plurality of operating systems 110 and 120 installed therein according to an embodiment.

According to an embodiment, a plurality of operating systems 110 and 120 may be installed in the device 100. For example, a first operating system 110 and a second operating system 120 may be installed in the device 100. However, this is merely an example, and two or more operating systems may be installed in the device 100. Also, at least some of a plurality of operating systems installed in the device 100 may be executed in the foreground of the device 100, and some others may be executed in the background of the device 100. Herein, the operating systems executed in each of the foreground and the background may be determined according to the user's selection.

According to an embodiment, the device 100 may display a user interface of at least one of the plurality of operating systems 110 and 120 on the screen of the device 100. For example, the device 100 may display the user interface of the second operating system 120 executed in the foreground on the screen of the device 100, and may not display the user interface of the first operating system 110 executed in the background on the screen of the device 100. However, this is merely an embodiment, and the device 100 may simultaneously display the respective user interfaces of two or more operating systems 110 and 120 on the screen of the device 100.

According to an embodiment, the device 100 may store applications executed in each of the plurality of operating systems. For example, the device 100 may store a first e-mail application and a first messenger application executed in the first operating system 110. Also, for example, the device 100 may store a second e-mail application, a second messenger application, and a second text editing application executed in the second operating system 120. Herein, at least one first application executed in the first operating system 110 and at least one second application executed in the second operating system 120 may be different from each other in terms of the types and formats of instructions constituting the respective applications.

According to an embodiment, the device 100 may display a shortcut icon 122 of at least one application 112 installed in another operating system (e.g., 110) on the user interface of a selected operating system (e.g., 120) among the plurality of operating systems 110 and 120. Herein, a shortcut icon may provide identification information of an application and path information for execution of the application, and may be displayed on a user interface in the form of at least one of a text, a sound, an image, and a moving image.

For example, the device 100 may display a shortcut icon of each of at least one application installed in the first operating system 110 on the user interface of the second operating system 120. As another example, the device 100 may display a shortcut icon of an application selected by the user among at least one application installed in the first operating system 110 on the user interface of the second operating system 120. Herein, the device 100 may provide the user with the identification information of the application installed in the first operating system 110 so that the user may easily select the application whose shortcut icon is to be created.

According to an embodiment, the device 100 may provide an environment allowing the user to more easily use the application installed in each of the plurality of operating systems, by displaying the shortcut icon of the application installed in another operating system (e.g., 110) on the user interface of a selected operating system (e.g., 120).

Figure 2:
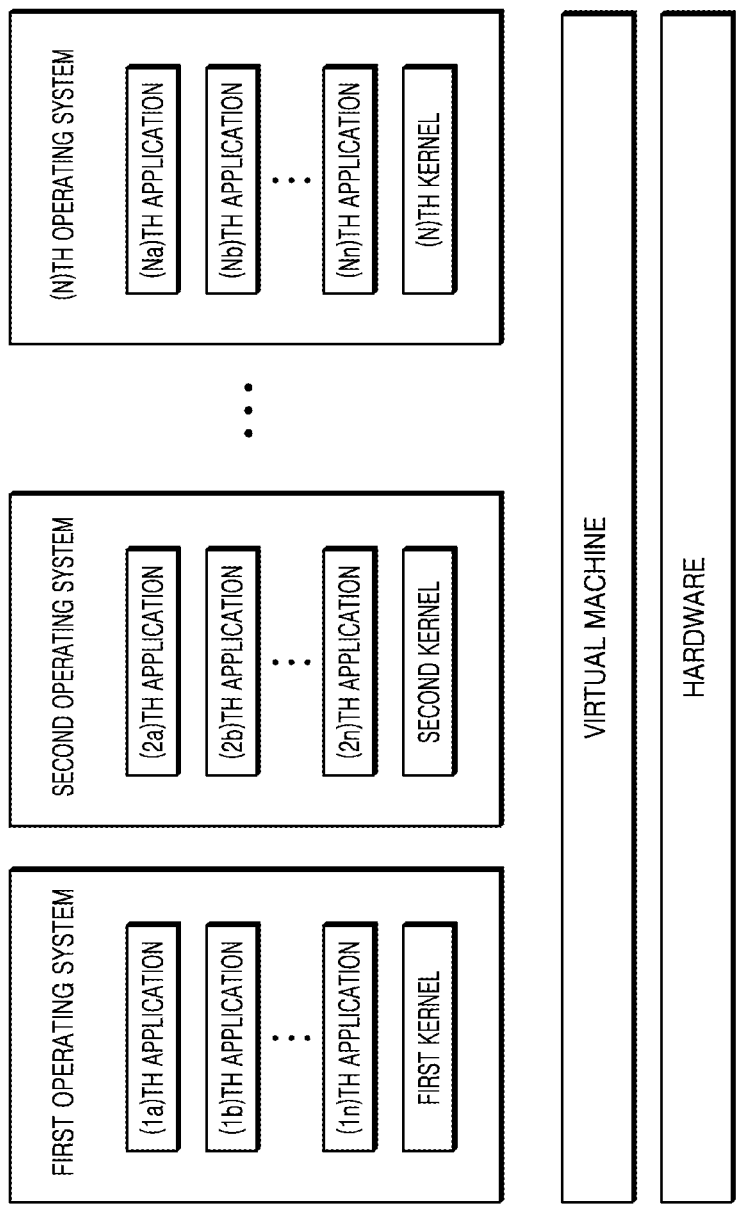
FIG. 2 is a conceptual diagram illustrating a method of driving a plurality of operating systems by a device.

FIG. 2 is a conceptual diagram illustrating a method of driving a plurality of operating systems by a device 100.

As illustrated in FIG. 2, a plurality of operating systems such as a first operating system, a second operating system, and an Nth operating system may be installed in the device 100. Also, the device 100 may store at least one application executed in each of the plurality of operating systems. For example, the device 100 may store (1a)th to (1n)th applications executed in the first operating system.

The device 100 may execute a virtual machine providing a virtual computing environment in order to drive a plurality of operating systems in one device. Herein, the virtual machine may provide a virtual computing environment created by being allocated the hardware resources of the device. Each of the plurality of operating systems installed in the device 100 may access the hardware through a kernel module controlling the access to the virtual machine.

For example, the hardware may include a processor, a memory, a display, and/or an input device, and may include additional hardware devices such as a microphone, a speaker, a power supply device, an external removable memory, an antenna, a radio wave transmitter, a global positioning system (GPS), a camera, a motion sensor, a geomagnetic sensor, a proximity sensor, and an illuminance sensor. According to an embodiment, as described with reference to FIG. 1, the device 100 may display the shortcut icon of the application executable in any one of the plurality of operating systems on the user interface of another operating system through the processor of the hardware based on the first user input and the second user input.

Figure 3:
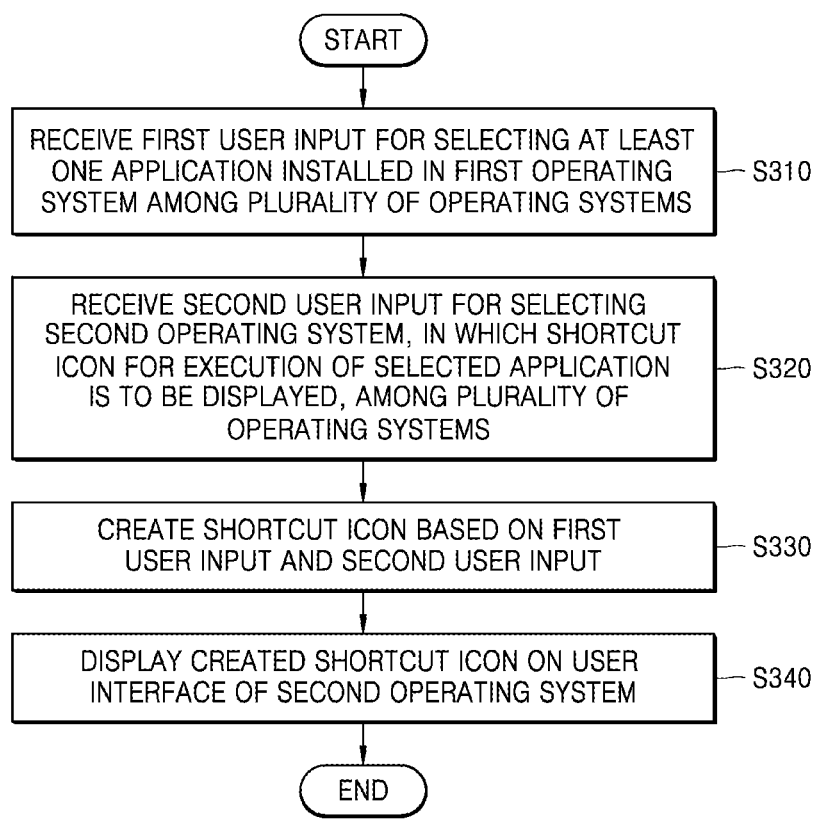
FIG. 3 is a flow diagram illustrating a method of controlling a device having a plurality of operating systems installed therein according to an embodiment.

FIG. 3 is a flow diagram illustrating a method of controlling a device having a plurality of operating systems installed therein according to an embodiment.

In operation S310, the device may receive a first user input for selecting at least one application installed in a first operating system among a plurality of operating systems.

According to an embodiment, a plurality of operating systems may be installed in the device. For example, a first operating system and a second operating system may be installed in the device. However, this is merely an embodiment, and the inventive concept is not limited thereto.

According to an embodiment, the device 100 may select the at least one application installed in the first operating system based on the user input received on the user interface of the first operating system displayed on the screen of the device 100. For example, the device 100 may select a preset application among a plurality of applications installed in the first operating system according to the receiving of the first user input. As another example, the device 100 may select at least one application corresponding to the first user input among a plurality of applications installed in the first operating system according to the receiving of the first user input.

However, this is merely an embodiment. According to another embodiment, when the user interface of another operating system other than the first operating system among the plurality of operating systems is displayed on the screen of the device, the device may display a list including the identification information of the application installed in the first operating system on the displayed user interface. For example, when the user interface of the second operating system is displayed on the screen of the device, the device 100 may display a list including identification information about a plurality of applications installed in the first operating system on the user interface of the second operating system. The device 100 may select at least one application corresponding to the first user input among the plurality of applications displayed in the list.

In operation S320, the device 100 may receive a second user input for selecting the second operating system, in which a shortcut icon for execution of the selected application is to be displayed, among the plurality of operating systems.

For example, when at least one application installed in the first operating system is selected, the device 100 may select the second operating system in which a shortcut icon of the selected at least one application is to be displayed.

However, this is merely an embodiment. For example, when at least one application installed in the first operating system is selected on the user interface of the second operating system displayed on the device 100, the operation S320 of receiving the second user input for specifying the second operating system may be skipped.

In operation S330, the device 100 may create the shortcut icon based on the first user input and the second user input.

According to an embodiment, the device 100 may create the shortcut icon including an instruction for processing the at least one application selected based on the first user input in the second operating system selected based on the second user input. Herein, the created shortcut icon may include path information for accessing the position of the selected at least one application and identification information of the selected at least one application.

In operation S340, the device 100 may display the created shortcut icon on the user interface of the second operating system.

According to an embodiment, the device 100 may display the created shortcut icon at a preset position on the user interface of the second operating system. For example, the device 100 may display the shortcut icon including an image representing the selected application at one side on the user interface of the second operating system. Also, an identifier representing the first operating system having the selected at least one application installed therein may be displayed on the shortcut icon.

According to an embodiment, when a plurality of shortcut icons are displayed on the user interface of the second operating system, the device 100 may classify and display the plurality of shortcut icons according to the types of operating systems in which the applications corresponding respectively to the plurality of shortcut icons are installed.

Figure 4:
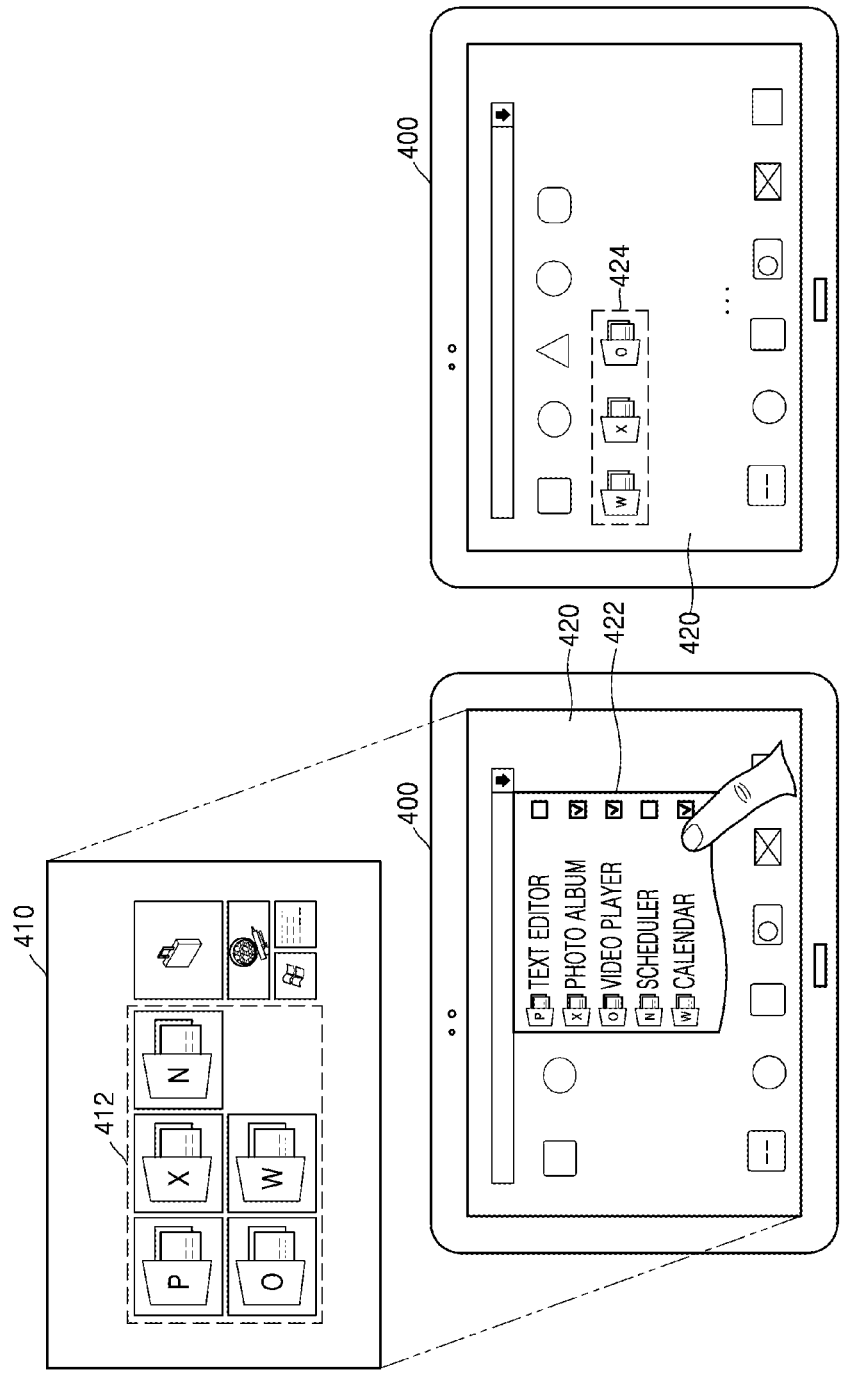
FIG. 4 is a diagram illustrating a method of creating a shortcut icon of at least one application installed in a first operating system on a user interface of a second operating system by a device according to an embodiment.

FIG. 4 is a diagram illustrating a method of creating a shortcut icon of at least one application installed in a first operating system 410 on a user interface of a second operating system by a device 400 according to an embodiment.

Referring to FIG. 4, the user interface of a second operating system 420 among a plurality of operating systems 410 and 420 installed in the device 400 may be displayed on the screen of the device 400.

According to an embodiment, the device 400 may display a list 422 including the identification information of a plurality of applications 412 installed in the first operating system 410 on the user interface of the second operating system 420. For example, the device 400 may display the list 422 on the user interface of the second operating system 420 when receiving a request for the identification information of the plurality of applications 412 installed in the first operating system 410 from the user. For example, the list 422 may include and display an identifier of each of the plurality of applications 412 installed in the first operating system 410 and an identifier of a file stored in each of the plurality of applications 412.

According to an embodiment, the device 400 may select at least one application corresponding to the received first user input in the list 422. For example, when receiving a user's touch input on the identifiers of a photo album application, a video player application, and a calendar application in the list 422, the device 400 may select the photo album application, the video player application, and the calendar application.

According to an embodiment, the device 400 may display shortcut icons 424 of the selected photo album application, video player application, and calendar application on the user interface of the second operating system 420. Herein, the shortcut icons 424 may be displayed at a preset position on the user interface of the second operating system 420. Also, as another example, the shortcut icons 424 may be displayed at a position selected by the user on the user interface of the second operating system 420.

Figure 5:
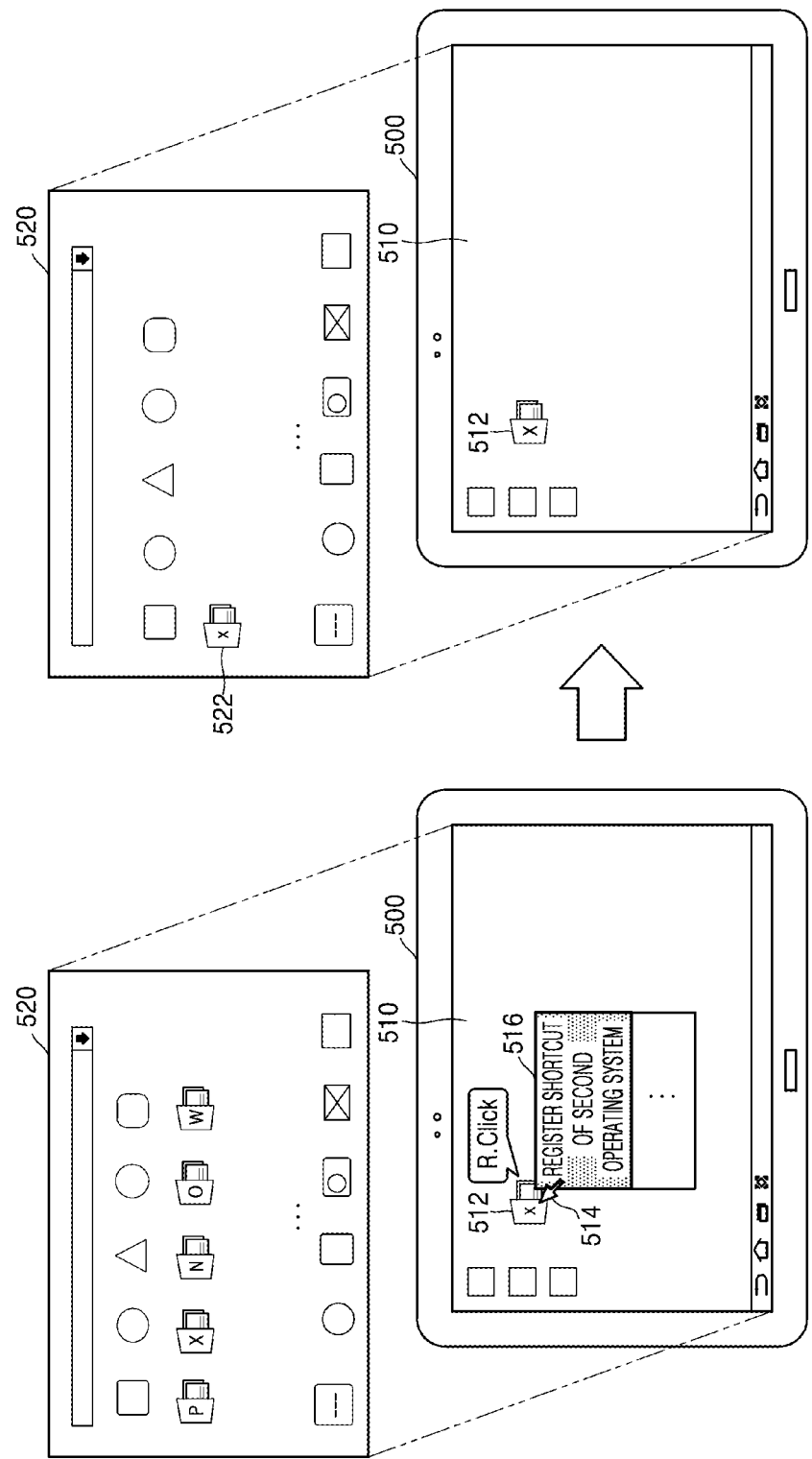
FIG. 5 is a diagram illustrating a method of creating a shortcut icon of an application installed in a first operating system on a user interface of a second operating system by a device according to an embodiment.

FIG. 5 is a diagram illustrating a method of creating a shortcut icon of an application 512 installed in a first operating system 510 on a user interface of a second operating system 520 by a device 500 according to an embodiment.

Referring to FIG. 5, a user interface of the first operating system 510 among a plurality of operating systems 510 and 520 installed in the device 500 may be displayed on the screen of the device 500. An icon of at least one application installed in the first operating system 510 may be displayed on the user interface of the first operating system 510.

According to an embodiment, the device 500 may sense a first user input received on an icon 512 of an "x" application among the at least one application. For example, the device 500 may sense the first user input for clicking a right button while locating a cursor 514 of an input device on the icon 512 of the application.

According to an embodiment, when receiving the first user input, the device 500 may display a pop-up window 516 with a guide message "Register Shortcut of Second Operating System 520" displayed therein. Also, the device 500 may receive a second user input for clicking the pop-up window 516.

According to an embodiment, the device 500 may display a shortcut icon 522 of the "x" application on the user interface of the second operating system 520 according to the receiving of the first user input and the second user input. In order to execute the "x" application, the shortcut icon 522 may include path information representing a position at which the "x" application is installed in the first operating system 510.

According to an embodiment, when receiving an input for selecting the shortcut icon 522 of the "x" application displayed on the user interface of the second operating system 520 from the user, the device 500 may execute the "x" application installed in the first operating system 510. Accordingly, a user interface according to the execution of the "x" application may be displayed on the screen of the device 500.

Figure 6:
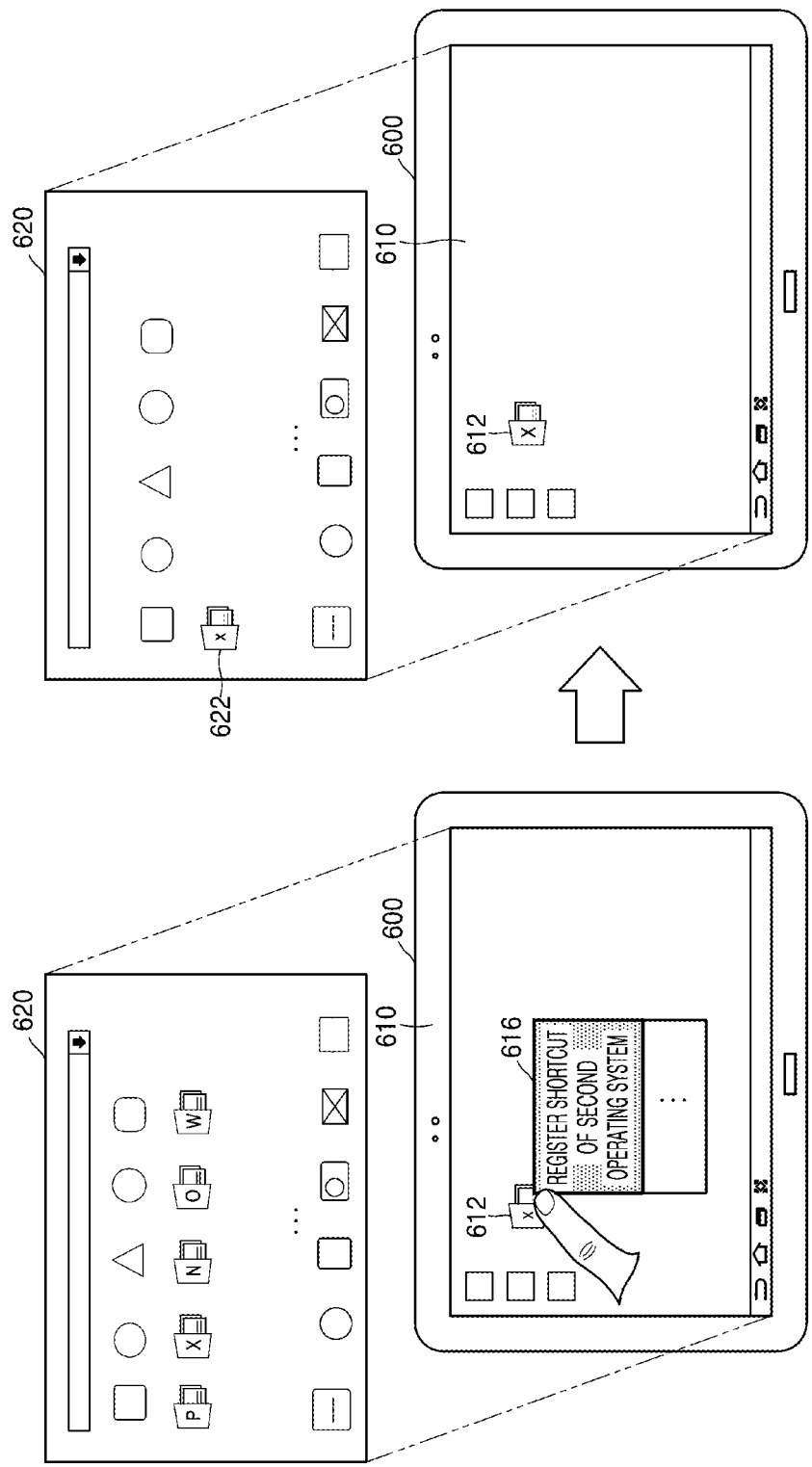
FIG. 6 is a diagram illustrating a method of creating a shortcut icon of an application installed in a first operating system on a user interface of a second operating system by a device according to another embodiment.

FIG. 6 is a diagram illustrating a method of creating a shortcut icon of an application 612 installed in a first operating system 610 on a user interface of a second operating system 620 by a device 600 according to another embodiment.

Referring to FIG. 6, a user interface of the first operating system 610 among a plurality of operating systems 610 and 620 installed in the device 600 may be displayed on the screen of the device 600. An icon of at least one application installed in the first operating system 610 may be displayed on the user interface of the first operating system 610.

According to an embodiment, the device 600 may receive a first user input for touching an icon 612 of an "x" application among the at least one application with a finger 614. Also, when receiving the first user input, the device 600 may display a pop-up window 616 with a guide message "Register Shortcut of Second Operating System 620" displayed therein. Accordingly, the device 600 may receive a second user input for touching the pop-up window 616.

According to an embodiment, the device 600 may display a shortcut icon 622 of the "x" application on the user interface of the second operating system 620 according to the receiving of the first user input and the second user input.

Figure 7:
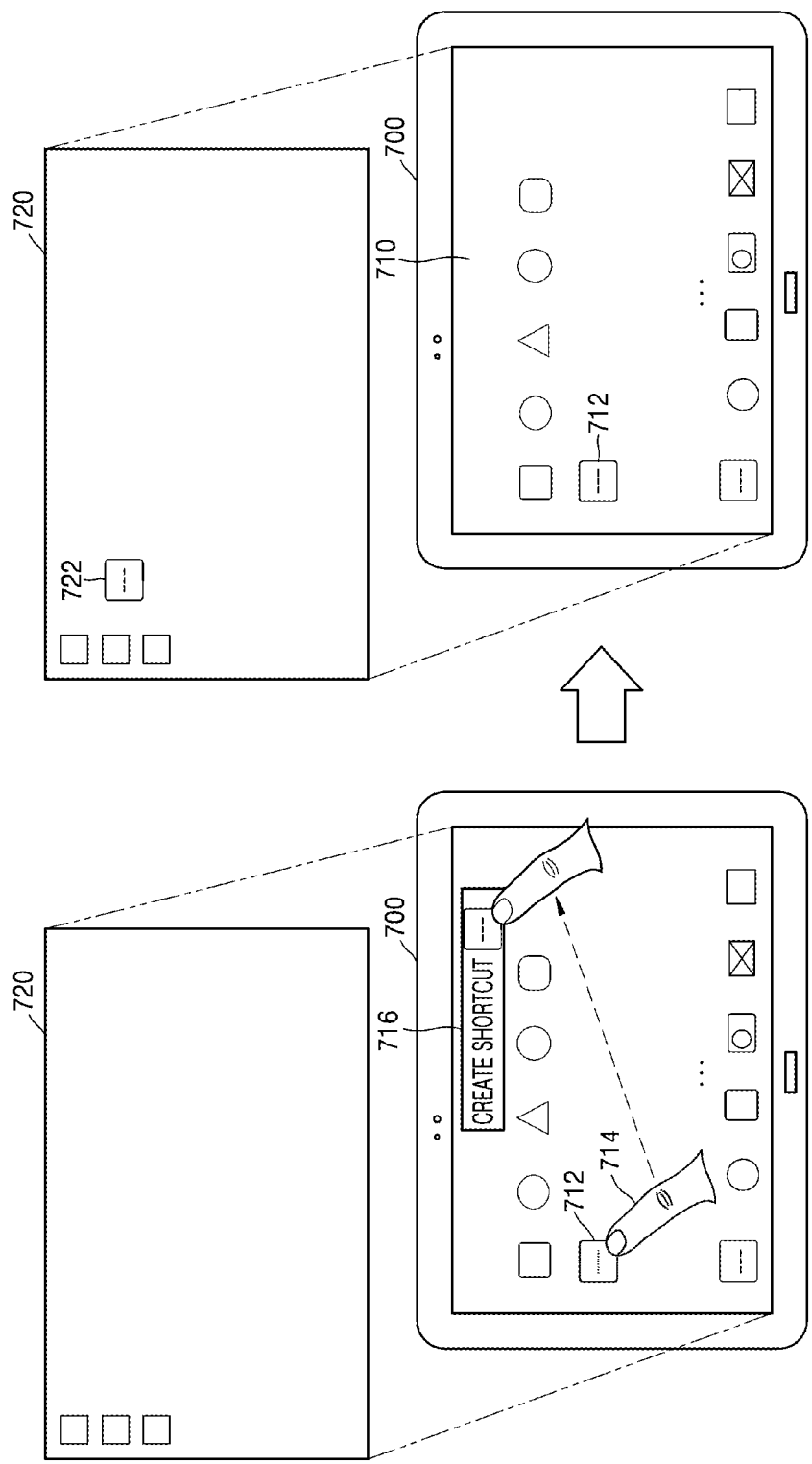
FIG. 7 is a diagram illustrating a method of creating a shortcut icon of an application installed in a first operating system on a user interface of a second operating system by a device according to another embodiment.

FIG. 7 is a diagram illustrating a method of creating a shortcut icon of an application 712 installed in a first operating system 710 on a user interface of a second operating system 720 by a device 700 according to another embodiment.

Referring to FIG. 7, a user interface of the first operating system 710 among a plurality of operating systems 710 and 720 installed in the device 700 may be displayed on the screen of the device 700. An icon of at least one application installed in the first operating system 710 may be displayed on the user interface of the first operating system 710.

According to an embodiment, the device 700 may receive a first user input for touching an icon 712 of an "x" application among the at least one application with a finger 714 for a preset time or more. Also, when receiving the first user input, the device 700 may display a pop-up window 716 with a guide message "Create Shortcut of Second Operating System 720" displayed therein.

According to an embodiment, the device 700 may receive a second user input for dragging to the pop-up window 716 while touching the icon 712 of the "x" application with the finger 714.

According to an embodiment, the device 700 may display a shortcut icon 722 of the "x" application on the user interface of the second operating system 720 according to the receiving of the first user input and the second user input.

Figure 8:
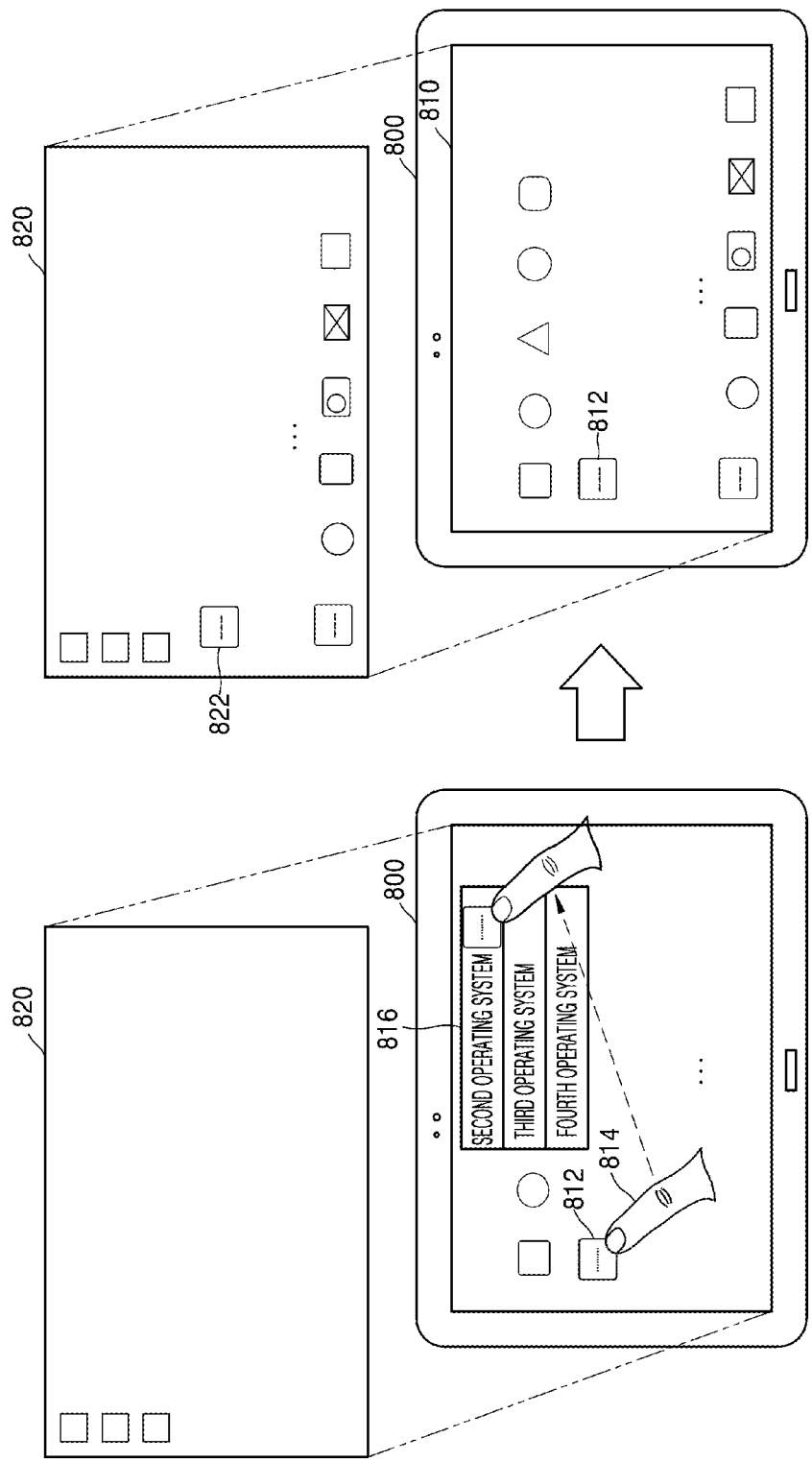
FIG. 8 is a diagram illustrating a method of selecting an operating system, in which a shortcut icon is to be displayed, among a plurality of operating systems by a device according to an embodiment.

FIG. 8 is a diagram illustrating a method of selecting an operating system, in which a shortcut icon is to be displayed, among a plurality of operating systems by a device 800 according to an embodiment.

Referring to FIG. 8, a user interface of a first operating system 810 among a plurality of operating systems installed in the device 800 may be displayed on the screen of the device 800. An icon of at least one application installed in the first operating system 810 may be displayed on the user interface of the first operating system 810.

According to an embodiment, the device 800 may receive a first user input for touching an icon 812 of a messenger application among the at least one application with a finger 814 for a preset time or more. Also, when receiving the first user input, the device 800 may display a pop-up window 816 displaying identification information of other operating systems installed in the device 800.

According to an embodiment, the device 800 may receive a second user input for dragging to an identifier of a second operating system among the menu of the pop-up window 816 while touching the icon 812 of the messenger application with the finger 814.

According to an embodiment, the device 800 may display a shortcut icon 822 of the messenger application on the user interface of the second operating system 820 according to the receiving of the first user input and the second user input.

Figure 9:
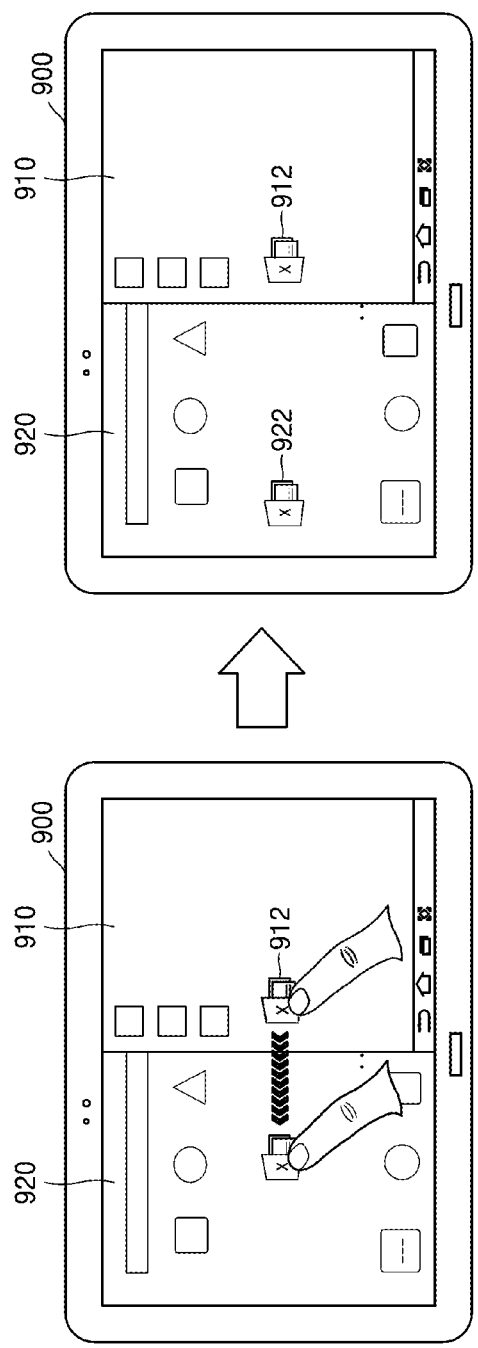
FIG. 9 is a diagram illustrating a method of creating a shortcut icon of an application by a device according to an embodiment when user interfaces of a plurality of operating systems are displayed.

FIG. 9 is a diagram illustrating a method of creating a shortcut icon of an application by a device 900 according to an embodiment when user interfaces of a plurality of operating systems 910 and 920 are displayed.

Referring to FIG. 9, the user interfaces of a first operating system 910 and a second operating system 920 among a plurality of operating systems installed in the device 900 may be displayed on the screen of the device 900. However, this is merely an embodiment, and the user interfaces of two or more operating systems may be displayed on the screen of the device 900.

According to an embodiment, the device 900 may receive a first user input for touching a finger to an icon 912 of an "x" application installed in the user interface of the first operating system 910 among the user interfaces of the plurality of operating systems 910 and 920 displayed on the screen thereof. Also, the device 900 may receive a second user input for dragging to the user interface of the second operating system 920 while touching the icon 912 with the finger.

According to an embodiment, the device 900 may display a shortcut icon 922 of the "x" application on the user interface of the second operating system 920 according to the receiving of the first user input and the second user input. In order to execute the "x" application, the shortcut icon 922 may include path information representing a position at which the "x" application is installed in the first operating system 910.

According to an embodiment, when receiving an input for selecting the shortcut icon 922 of the "x" application displayed on the user interface of the second operating system 920 from the user, the device 900 may execute the "x" application installed in the first operating system 910. Accordingly, a user interface according to the execution of the "x" application may be displayed on the screen of the device 900.

Figure 10:
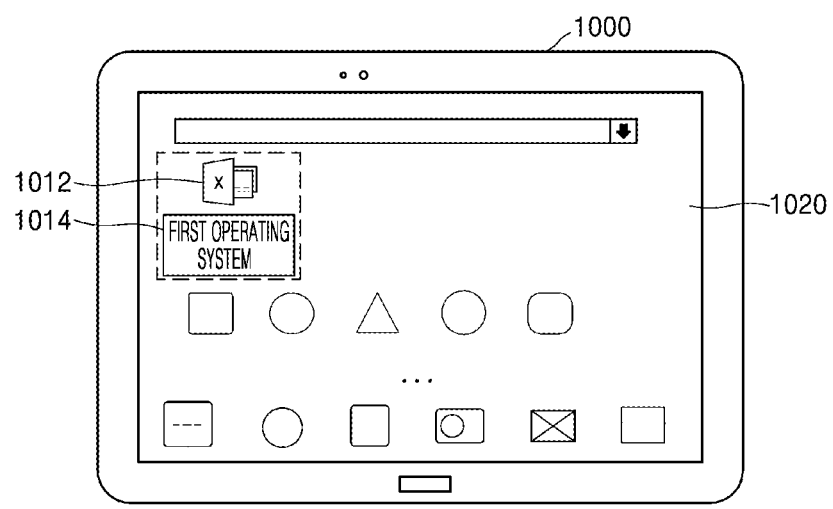
FIG. 10 is a diagram illustrating a shortcut icon displayed in a device according to an embodiment.

FIG. 10 is a diagram illustrating a shortcut icon displayed in a device 1000 according to an embodiment.

According to an embodiment, the device 1000 may display a shortcut icon 1012 of an "x" application installed in a first operating system (not illustrated) among a plurality of operating systems installed in the device 1000 on a user interface of a second operating system 1020.

Referring to FIG. 10, an identifier 1014 representing the first operating system (not illustrated) in which the "x" application is installed may be displayed in the shortcut icon 1012 of the "x" application. Herein, the identifier 1014 representing the first operating system (not illustrated) may be any one of an image, a text, and a moving image.

According to an embodiment, by displaying the identifier representing the type of the operating system in which the "x" application is installed on the shortcut icon 1012 of the "x" application, the device may provide the user with the information about the operating system executed when the shortcut icon 1012 is selected.

Figure 11:
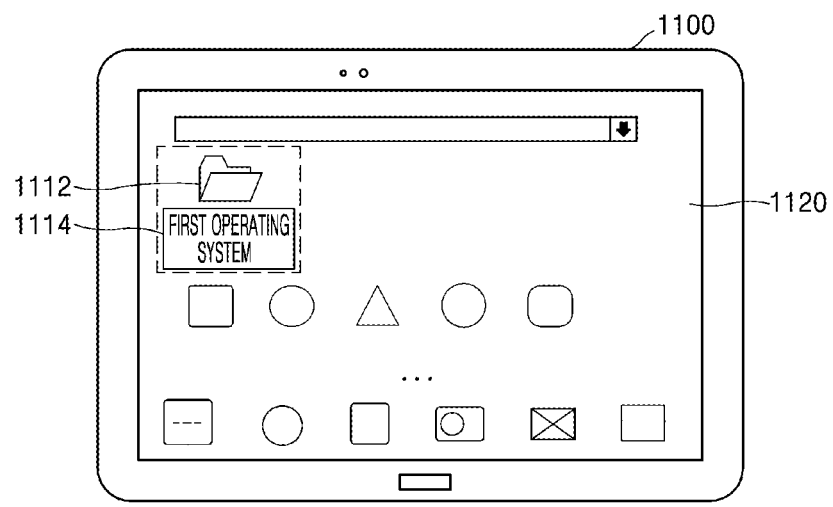
FIG. 11 is a diagram illustrating a method of displaying a shortcut icon by a device according to an embodiment.

FIG. 11 is a diagram illustrating a method of displaying a shortcut icon by a device 1100 according to an embodiment.

According to an embodiment, the device 1100 may classify and display the shortcut icons of the applications installed in at least one other operating system, according to the types of operating systems, on the application of a particular operating system among a plurality of operating systems installed in the device 1100.

Referring to FIG. 11, for example, the device 1100 may create a folder 1112 including a shortcut icon of at least one application installed in a first operating system (not illustrated) on a user interface of a second operating system 1120. Although FIG. 11 illustrates only the folder 1112 for the first operating system (not illustrated), this is merely for convenience of description and the device 1100 may also display a folder (not illustrated) including a shortcut icon of at least one application installed in a third operating system (not illustrated) installed in the device 1100.

According to an embodiment, an identifier 1114 representing the first operating system (not illustrated) may be displayed in the folder 1112 for the first operating system (not illustrated). Herein, the identifier 1114 representing the first operating system (not illustrated) may be any one of an image, a text, and a moving image.

According to an embodiment, when receiving a user input for selecting the folder for the first operating system (not illustrated), the device may display the shortcut icon of at least one application installed in the first operating system (not illustrated) on the user interface of the second operating system 1120.

Figure 12:
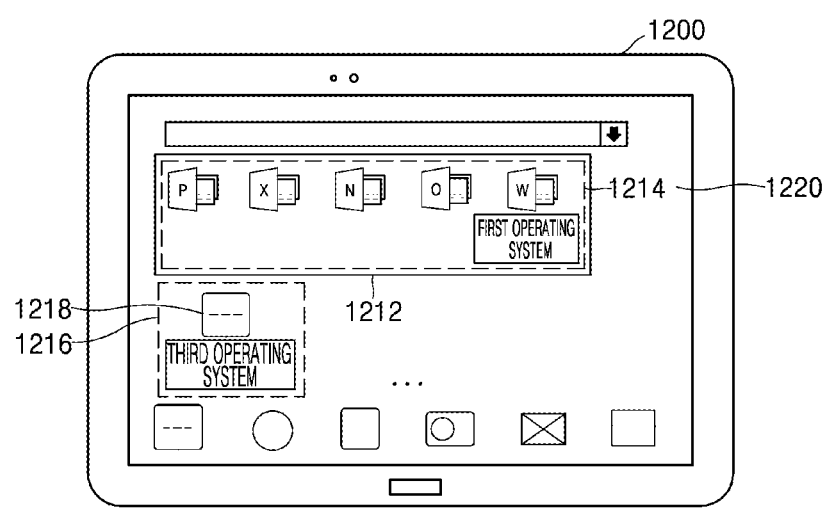
FIG. 12 is a diagram illustrating a method of displaying a shortcut icon by a device according to another embodiment.

FIG. 12 is a diagram illustrating a method of displaying a shortcut icon by a device 1200 according to another embodiment.

According to an embodiment, the device 1200 may classify and display the shortcut icons of the applications installed in at least one other operating system, according to the types of operating systems, on the application of a particular operating system among a plurality of operating systems installed in the device 1200.

Referring to FIG. 12, for example, the device 1200 may display tray menus 1212 and 1216 of other operating systems other than a second operating system 1220 among the plurality of operating systems installed in the device 1200 on a user interface of the second operating system 1220.

According to an embodiment, the device 1200 may display the shortcut icons of the respective corresponding applications on the tray menus 1212 and 1216 of the other applications. For example, the device 1200 may display a shortcut icon 1214 of at least one application installed in a first operating system on the first tray menu 1212 of the first operating system. Herein, the at least one application whose shortcut icon is created may be all the applications installed in the first operating system, or may be some preset applications among all the applications installed in the first operating system. Also, as another example, the at least one application whose shortcut icon 1214 is created may be an application selected by the user among all the applications installed in the first operating system.

Also, the device 1200 may display a shortcut icon 1218 of at least one application installed in a third operating system on the second tray menu 1216 of the third operating system.

According to an embodiment, the device 1200 may display the identifiers of the respective corresponding operating systems on the tray menus 1212 and 1216 of the other operating systems displayed on the user interface of the second operating system 1220. For example, the device 1200 may display the identifier representing the first operating system on the first tray menu 1212 and display the identifier representing the third operating system on the second tray menu 1216.

Figure 13:
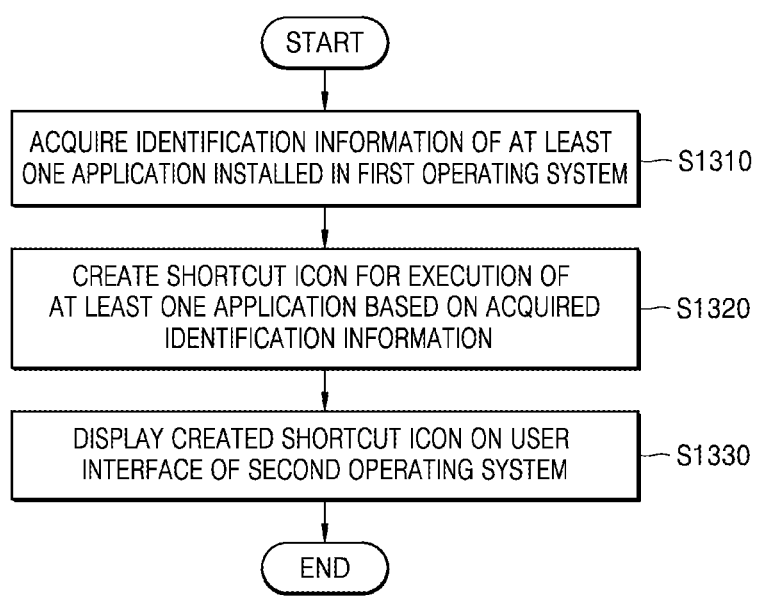
FIG. 13 is a flow diagram illustrating a method of displaying a shortcut icon of an application installed in any one of a plurality of operating systems on a user interface of another operating system by a device according to an embodiment.

FIG. 13 is a flow diagram illustrating a method of displaying a shortcut icon of an application installed in any one of a plurality of operating systems on a user interface of another operating system by a device 100 according to an embodiment.

In operation S1310, the device 100 may acquire identification information of at least one application installed in a first operating system.

According to an embodiment, when the first operating system is executed in the device 100, the device 100 may acquire the identification information of at least one application installed in the first operating system. For example, the device 100 may acquire an identifier of the title of the at least one application and path information representing a position at which the at least one application is executed on the first operating system.

However, this is merely an embodiment, and the device 100 may acquire identification information of at least one application selected among a plurality of applications installed in the first operating system. For example, when receiving a first user input for selecting at least one of a plurality of applications, the device 100 may select at least one of the plurality of applications.

In operation S1320, the device 100 may create a shortcut icon for execution of the at least one application based on the acquired identification information.

According to an embodiment, based on the acquired identification information, the device 100 may create the shortcut icon in the format processable in another operating system and the first operating system in which the at least one application is installed. Herein, for example, the shortcut icon may include identification information of the application and path information representing a position at which the application is installed in the first operating system. For example, based on the acquired identification information, the device 100 may create the shortcut icon of the at least one application in the format processable in a second operating system.

According to an embodiment, the device 100 may select an operating system, in which a shortcut icon of at least one application is to be created, among a plurality of operating systems according to a preset setting or a received second user input. For example, based on a user input, the device 100 may select the second operating system, in which a shortcut icon of at least one application is to be created, among a plurality of operating systems installed in the device 100.

In operation S1330, the device 100 may display the created shortcut icon on a user interface of the second operating system.

According to an embodiment, the device 100 may display the created shortcut icon on the user interface of the second operating system in which the at least one application is not installed.

According to an embodiment, when receiving a user input for requesting the execution of the application on the shortcut icon, the device 100 may execute the application installed in the first operating system. For example, when the user selects the shortcut icon on the user interface of the second operating system displayed on the screen of the device 100, the device 100 may execute the application installed in the first operating system. Accordingly, an execution screen of the application may be displayed on the screen of the device 100.

Figure 14:
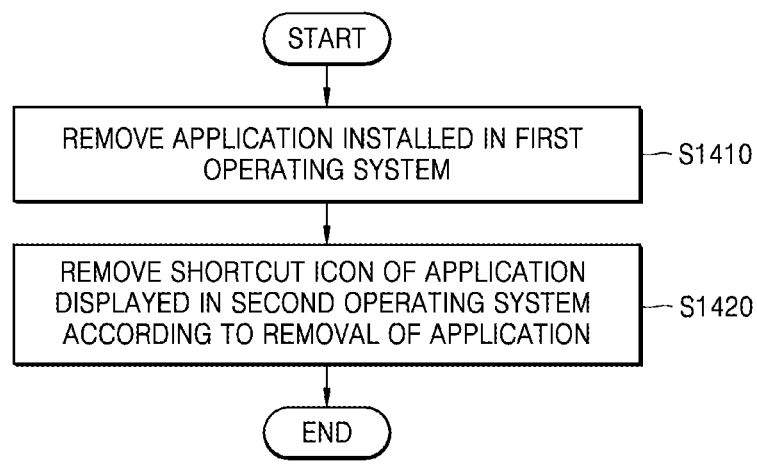
FIG. 14 is a flow diagram illustrating a method of removing a shortcut icon of an application according to removal of the application by a device according to an embodiment.

FIG. 14 is a flow diagram illustrating a method of removing a shortcut icon of an application according to removal of the application by a device 100 according to an embodiment.

In operation S1410, the device 100 may remove an application installed in a first operating system among a plurality of operating systems installed in the device 100.

According to an embodiment, the device 100 may remove the application installed in the first operating system according to a user's request. For example, when the user requests the removal of a particular application installed in the first operating system in a management menu of the application installed in the device 100, the device 100 may remove the particular application installed in the first operating system.

In operation S1420, the device 100 may remove a shortcut icon of the application displayed in a second operating system according to the removal of the application.

According to an embodiment, according to the removal of the application, the device 100 may remove the shortcut icon displayed on the user interface of another operating system and the operating system in which the application has been installed. For example, according to the removal of the application installed in the first operating system of the device 100, the device 100 may remove the shortcut icon of the application removed on the user interface of the second operating system.

Figure 15:
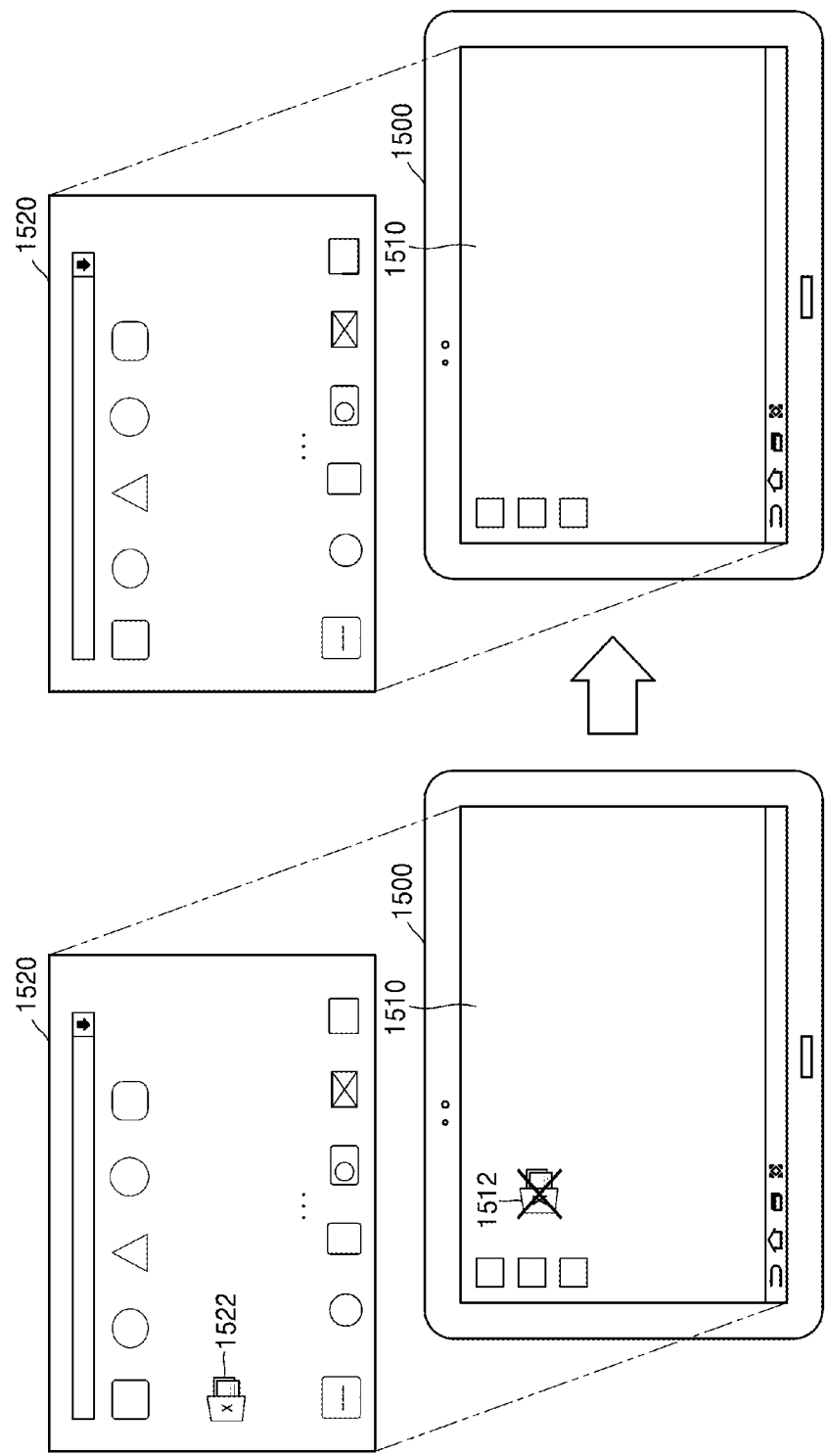
FIG. 15 is a diagram illustrating a method of removing a shortcut icon of an application according to removal of the application by a device according to an embodiment.

FIG. 15 is a diagram illustrating a method of removing a shortcut icon of an application according to removal of the application by a device 1500 according to an embodiment.

According to an embodiment, a plurality of operating systems 1510 and 1520 may be installed in the device 1500. For example, a first operating system 1510 and a second operating system 1520 may be installed in the device 1500. Also, at least one application may be executed in each of the first operating system 1510 and the second operating system 1520.

Referring to FIG. 15, according to an embodiment, an icon of an "x" application installed in the first operating system 1510 may be displayed on a user interface of the first operating system 1510. Also, an icon of the at least one application installed in the second operating system 1520 and a shortcut icon of the "x" application installed in the first operating system 1510 may be displayed on a user interface of the second operating system 1520.

The device 1500 may remove the "x" application installed in the first operating system 1510 according to a user's request. According to the removal of the "x" application, the device 1500 may remove the shortcut icon displayed on the user interface of another operating system and the operating system in which the "x" application has been installed. For example, the device 1500 may remove the shortcut icon 1522 of the "x" application displayed in the second operating system 1520.

Figure 16:
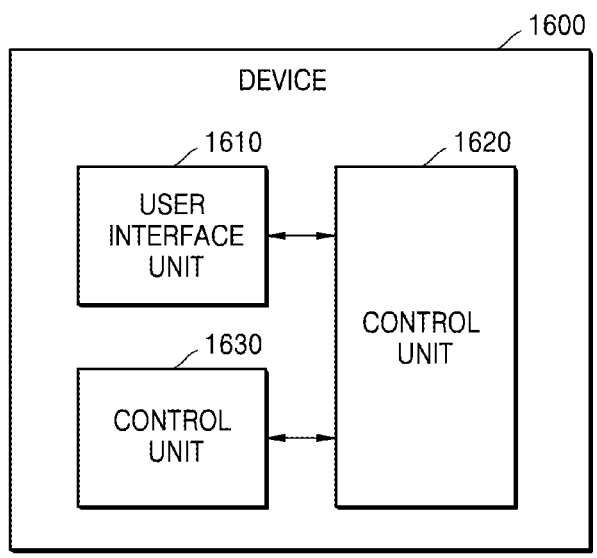
FIGS. 16 and 17 are block diagrams of a device having a plurality of operating systems installed therein according to an embodiment.
Figure 17:
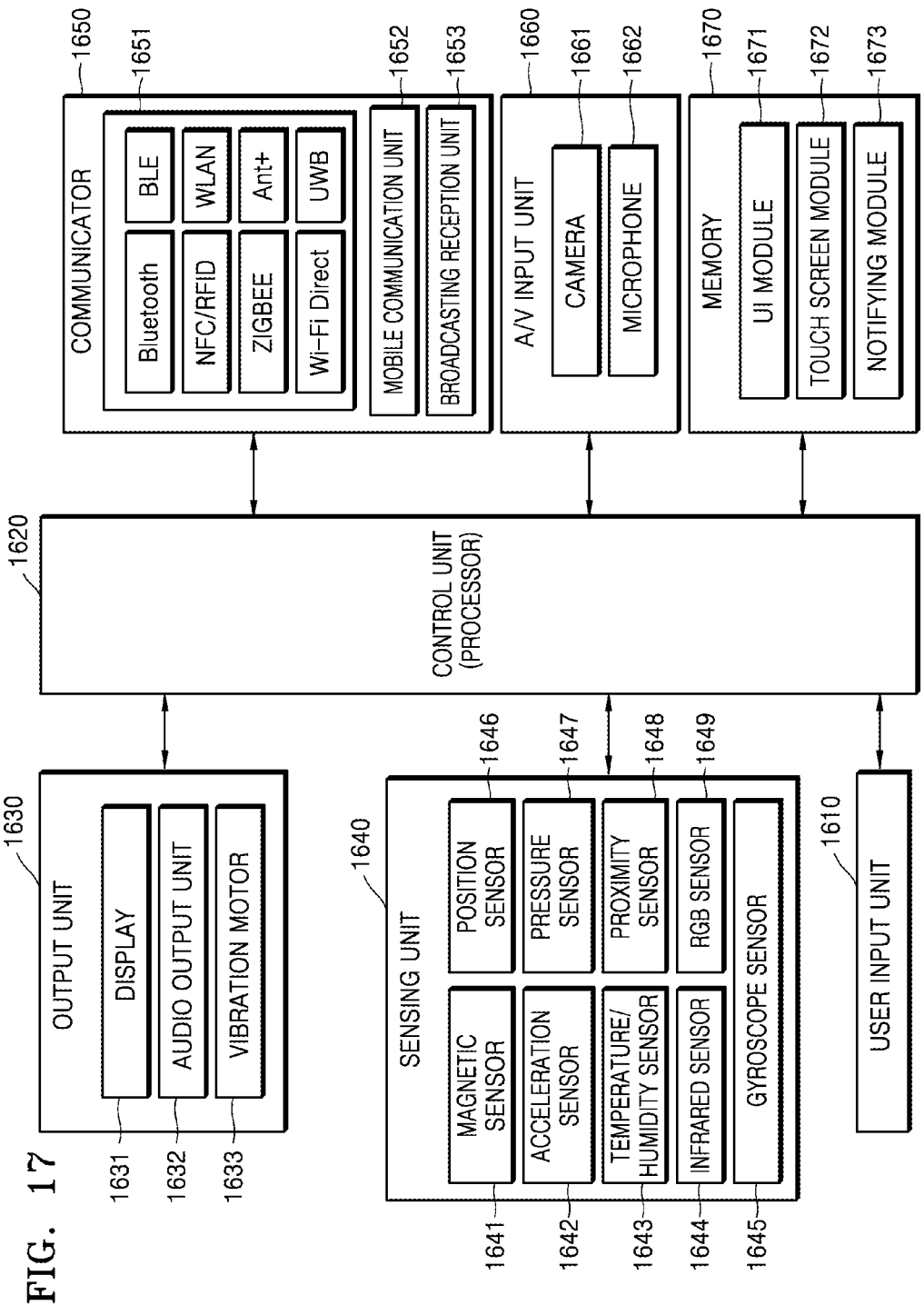

FIGS. 16 and 17 are block diagrams of a device 1600 having a plurality of operating systems installed therein according to an embodiment.

As illustrated in FIG. 16, the device 1600 may include a user input unit 1610, a control unit 1620, and an output unit 1630. However, all the elements illustrated in FIG. 16 are not necessary elements of the device 1600. The device 1600 may include elements more or less than the elements illustrated in FIG. 16.

For example, as illustrated in FIG. 17, the device 1600 according to an embodiment may further include a sensing unit 1640, a communication unit 1650, an audio/video (A/V) input unit 1660, and a memory 1670 in addition to the user input unit 1610, the control unit 1620, and the output unit 1630.

The device 1600 of FIGS. 16 and 17 may correspond to the device described with reference to FIGS. 1 to 15.

The above elements will be described below in detail.

According to an embodiment, the user input unit 1610 may refer to a unit through which the user inputs data for controlling the device 1600. For example, the user input unit 1610 may include, but is not limited to, a keypad, a dome switch, a touch pad (e.g., a capacitive overlay type, a resistive overlay type, an infrared beam type, a surface acoustic wave type, an integral strain gauge type, or a piezoelectric type), a jog wheel, and a jog switch.

According to an embodiment, the user input unit 1610 may receive a first user input for selecting at least one application installed in a first operating system among a plurality of operating systems. Also, the user input unit 1610 may receive a second user input for selecting a second operating system, in which a shortcut icon for execution of the selected application is to be displayed, among the plurality of operating systems.

However, this is merely an embodiment of the inventive concept, and the user input unit 1610 may receive a user input necessary to perform an operation of the device 1600 described with reference to FIGS. 1 to 15.

The control unit 1620 may control the overall operations of the device 1600. For example, the control unit 1620 may control the overall operations of the user input unit 1610, the output unit 1630, the sensing unit 1640, the communication unit 1650, the A/V input unit 1660, and the memory 1670 by executing the programs stored in the memory 1670.

According to an embodiment, the control unit 1620 may create the shortcut icon based on the first user input and the second user input. Also, the control unit 1620 may display the created shortcut icon on a user interface of the second operating system.

According to an embodiment, the control unit 1620 may select a preset application among the at least one application installed in the first operating system according to the receiving of the first user input. Also, the control unit 1620 may create a shortcut icon of each of the selected preset application.

According to an embodiment, when the first user input is received on a list including identification information about a plurality of applications installed in the first operating system, the control unit 1620 may select the at least one application among the plurality of applications displayed in the list based on the first user input.

According to an embodiment, the control unit 1620 may select the at least one application according to the receiving of the first user input on an icon of the at least one application displayed on a user interface of the first operating system.

Also, when the second user input is received on a list including identification information about the plurality of operating systems installed in the device 1600, the control unit 1620 may select the second operating system among the plurality of operating systems displayed in the list based on the second user input.

According to an embodiment, the control unit 1620 may create a shortcut icon about the at least one application according to the receiving of the first user input for selecting an icon of the at least one application displayed on the user interface of the first operating system and the second user input for dragging the selected icon on the user interface of the second operating system.

Also, according to an embodiment, the control unit 1620 may remove the shortcut icon on the user interface of the second operating system according to removal of the at least one application from the first operating system.

The output unit 1630 may be configured to perform the operation determined by the control unit 1620 and may include, for example, a display unit 1631, an audio output unit 1632, and a vibration motor 1633.

According to an embodiment, the display unit 1631 may display a user interface of each of the plurality of operating systems installed in the device 1600. Also, the display unit 1631 may display the list including the identification information about the plurality of applications installed in the first operating system. Also, the display unit 1631 may display the list including the identification information about the plurality of operating systems installed in the device 1600.

According to an embodiment, the display unit 1631 may classify and display a plurality of shortcut icons displayed on the user interface of the second operating system according to the types of operating systems.

When the display unit 1631 includes a touchscreen with a layer structure of a touch pad, the display unit 1631 may also be used as an input device in addition to an output device. The display unit 1631 may include at least one of a liquid crystal display (LCD), a thin film transistor liquid crystal display (TFT-LCD), an organic light-emitting diode (OLED) display, a flexible display, a three-dimensional (3D) display, and an electrophoretic display. Also, the device 1600 may further include one or more display units in addition to the display unit 1631 according to some embodiments.

The audio output unit 1632 may output audio data received from the communication unit 1650 or stored in the memory 1670. Also, the audio output unit 1632 may output audio signals related to functions (e.g., call signal reception, message reception, and notification) performed in the device 1600. The audio output unit 1632 may include, for example, a speaker and a buzzer.

The vibration motor 1633 may output a vibration signal. For example, the vibration motor 1633 may output a vibration signal corresponding to an output of audio data or video data (e.g., a call signal reception sound and a message reception sound). Also, the vibration motor 1633 may output a vibration signal when a touch is input to a touchscreen.

The sensing unit 1640 may include, but is not limited to, at least one of a magnetic sensor 1641, an acceleration sensor 1642, a temperature/humidity sensor 1643, an infrared sensor 1644, a gyroscope sensor 1645, a position sensor (e.g., GPS sensor) 1646, a pressure sensor 1647, a proximity sensor 1648, and an RGB sensor (illuminance sensor) 1649. Since those of ordinary skill in the art may intuitively infer the respective functions of the sensors from the respective names thereof, detailed descriptions thereof will be omitted for conciseness.

The communication unit 1650 may include one or more elements for allowing communication between the device 1600 and other devices. For example, the communication unit 1650 may include a short-range wireless communication unit 1651, a mobile communication unit 1652, and a broadcast receiving unit 1653.

The short-range wireless communication unit 1651 may include, but is not limited to, a Bluetooth communication unit, a Bluetooth Low Energy (BLE) communication unit, a near field communication unit, a WLAN (WiFi) communication unit, a ZigBee communication unit, an infrared data association (IrDA) communication unit, a WiFi Direct (WFD) communication unit, a ultra wideband (UWB) communication unit, and Ant+ communication unit.

The mobile communication unit 1652 may transmit/receive wireless signals with at least one of a base station, an external terminal, and a server on a mobile communication network. Herein, the wireless signals may include voice call signals, video call signals, or various types of data for transmission and reception of text/multimedia messages.

The broadcast receiving unit 1653 may receive broadcast signals and/or broadcast-related information from external devices through broadcast channels. The broadcast channels may include satellite channels and terrestrial channels. In some embodiments, the device 1600 may not include the broadcast receiving unit 1653.

The A/V input unit 1660 may be used to input audio signals or video signals and may include, for example, a camera 1661 and a microphone 1662. The camera 1661 may obtain an image frame such as a still image or a moving image through an image sensor in a video call mode or a photographing mode. The image captured through the image sensor may be processed by the control unit 1620 or a separate image processing unit (not illustrated).

The image frame processed by the camera 1661 may be stored in the memory 1670, or may be transmitted to an outside thereof through the communication unit 1650. Two or more cameras 1661 may be provided according to the configurations of the device 1600.

The microphone 1662 may receive an input of an external audio signal and process the same into electrical audio data. For example, the microphone 1662 may receive an audio signal from an external device or a speaker. The microphone 1662 may use various noise cancellation algorithms for canceling a noise that may be generated in the process of receiving an input of an external audio signal.

The memory 1670 may store a program for processing and control of the control unit 1620 and may store input/output data.

According to an embodiment, the memory 1670 may store a plurality of operating systems. Also, the memory 1670 may store an application executed in each of the plurality of operating systems. Also, the memory 1670 may store a virtual machine for executing each of the plurality of operating systems.

According to an embodiment, the memory 1670 may store the preset priority information of the plurality of operating systems.

The memory 1670 may include at least one type of storage medium from among flash memory type, hard disk type, multimedia card micro type, card type memory (e.g., SD and XD memories), random-access memory (RAM), static random-access memory (SRAM), read-only memory (ROM), electronically erasable programmable read-only memory (EEPROM), programmable read-only memory (PROM), magnetic memory, magnetic disk, and optical disk. Also, the device 1600 may include a cloud server or a web storage for performing a storage function of the memory 1670 on the Internet.

The programs stored in the memory 1670 may be classified into a plurality of modules according to their functions and may be classified into, for example, a user interface (UI) module 1671, a touchscreen module 1672, and a notification module 1673.

The UI module 1671 may provide a specialized UI and a graphical user interface (GUI) that interlock with the device 1600 for respective applications. The touchscreen module 1672 may sense a touch gesture of the user on the touchscreen and transmit information about the touch gesture to the control unit 1620. According to an embodiment, the touchscreen module 1672 may recognize and analyze a touch code. The touchscreen module 1672 may include separate hardware including a controller.

Various sensors may be provided in or near the touchscreen to sense a proximity touch or a touch to the touchscreen. An example of the sensor for sensing a touch to the touchscreen may be a tactile sensor. The tactile sensor may refer to a sensor that senses a touch of an object in the degree of a human sense or more. The tactile sensor may sense a variety of information, such as the roughness of a touch surface, the hardness of a touch object, and the temperature of a touch point.

Another example of the sensor for sensing a touch to the touchscreen may be a proximity sensor.

The proximity sensor may refer to a sensor that detects the presence of an object approaching a detection surface or an object located in the proximity thereof without mechanical contact by using an electromagnetic force or infrared rays. Examples of the proximity sensor may include transmission type photoelectric sensors, direct reflection type photoelectric sensors, mirror reflection type photoelectric sensors, high frequency oscillation type proximity sensors, electrostatic capacity type proximity sensors, magnetic type proximity sensors, and infrared proximity sensors. Examples of the user's touch gesture may include tap, touch & hold, double tap, drag, panning, flick, drag & drop, and swipe.

The notification module 1673 may generate a signal for notifying the occurrence of an event in the device 1600. Examples of the event occurring in the device 1600 may include reception or acquisition of new information in an application, call signal reception, message reception, key signal input, schedule notification, and acquisition of a user input. The notification module 1673 may output a notification signal of a video signal type through the display unit 1631, output a notification signal of an audio signal type through the audio output unit 1632, and output a notification signal of a vibration signal type through the vibration motor 1633.

The devices according to the embodiments may include, for example, a processor, a memory for storing and executing program data, a permanent storage such as a disk drive, a communication port for communicating with an external device, and user interface (UI) devices such as a touch panel, keys, and buttons. The methods implemented by software modules or algorithms may be stored on computer-readable recording mediums as computer-readable codes or program commands that are executable on the processor. Examples of the computer-readable recording mediums may include magnetic storage mediums (e.g., read-only memories (ROMs), random-access memories (RAMs), floppy disks, and hard disks) and optical recording mediums (e.g., compact disk read-only memories (CD-ROMs) and digital versatile disks (DVDs)). The computer-readable recording mediums may also be distributed over network-coupled computer systems so that the computer-readable codes may be stored and executed in a distributed fashion. The computer-readable recording mediums are readable by a computer, and may be stored in a memory and executed in a processor.

All references, including publications, patent applications, and patents, cited herein may be hereby incorporated by reference to the same extent as if each reference is individually and specifically indicated to be incorporated by reference or is set forth in its entirety herein.

For the purpose of promoting the understanding of the embodiments, reference has been made to the embodiments illustrated in the drawings, and particular terms have been used to describe the embodiments. However, the scope of the embodiments is not limited by the particular terms, and the embodiments may encompass all elements that may be generally conceived by those of ordinary skill in the art.

The embodiments may be described in terms of functional block components and various processing operations. Such functional blocks may be implemented by any number of hardware and/or software components that execute particular functions. For example, the embodiments may employ various integrated circuit (IC) components, such as memory elements, processing elements, logic elements, and lookup tables, which may execute various functions under the control of one or more microprocessors or other control devices. Similarly, where the elements of the embodiments may be implemented by software programming or software elements, the embodiments may be implemented by any programming or scripting language such as C, C++, Java, or assembly language, with various algorithms being implemented by any combination of data structures, processes, routines, or other programming elements. Functional aspects may be implemented by an algorithm that is executed in one or more processors. Also, the embodiments may employ the related art for electronic environment setting, signal processing, and/or data processing. Terms such as "mechanism", "element", "unit", and "configuration" may be used in a broad sense, and are not limited to mechanical and physical configurations. The terms may include the meaning of software routines in conjunction with processors or the like.

Particular implementations described herein are merely exemplary and do not limit the scope of the embodiments in any way. For the sake of conciseness, descriptions of related art electronic configurations, control systems, software, and other functional aspects of the systems have been omitted. Also, the connection lines or connection members between various elements illustrated in the drawings represent exemplary functional connections and/or physical or logical connections between the various elements, and various alternative or additional functional connections, physical connections, or logical connections may be present in practical apparatuses. Also, no element may be essential to the practice of the embodiments unless the element is specifically described as "essential" or "critical".

The invention claimed is:

1. A method of operating a device having a plurality of operating systems installed therein, the method comprising:
while a first user interface and a second user interface are displayed, wherein the first user interface is displayed according to an execution of a first operating system and the second user interface is displayed according to an execution of a second operating system, and wherein the second operating system is different from the first operating system, receiving a first user input for selecting an icon of at least one application installed in the first operating system on the first user interface;

displaying, in the first user interface of the first operating system, a pop-up window displaying identification information of other operating systems installed in the device;

receiving a second user input, wherein the second user input is an input for dragging the selected icon from the first user interface to a selected position on the second user interface, or an input for dragging the selected icon to an identifier of the second operating system on the pop-up window;

creating a shortcut icon of the at least one application installed in the first operating system, including an identifier representing the first operating system displayed in the shortcut icon, in a format processable in the second operating system without installing the at least one application in the second operating system, in response to receiving the first user input and the second user input;

when the second user input is the input for dragging the selected icon from the first user interface to the selected position on the second user interface, displaying the created shortcut icon of the at least one application installed in the first operating system on the selected position on the second user interface of the second operating system;

when the second user input is the input for dragging the selected icon to the identifier of the second operating system on the pop-up window, displaying the created shortcut icon of the at least one application installed in the first operating system on a preset position on the second user interface of the second operating system;

receiving a third user input for selecting the created shortcut icon displayed on the second user interface; and executing the at least one application installed in the first operating system based on receiving the third user input, wherein the created shortcut icon includes path information for accessing a position of the at least one application in the first operating system and identification information of the at least one application.

2. The method of claim 1, further comprising selecting a preset application among the at least one application installed in the first operating system according to the receiving of the first user input,
wherein the creating of the shortcut icon comprises creating a shortcut icon of the selected preset application.

3. The method of claim 1, further comprising:
displaying a list including identification information about a plurality of applications installed in the first operating system; and
selecting, based on the first user input, the at least one application among the plurality of applications displayed in the list.

4. The method of claim 1, further comprising selecting the at least one application according to the receiving of the first user input on the icon of the at least one application displayed on the first user interface.

5. The method of claim 1, further comprising removing the shortcut icon from the second user interface of the second operating system according to removal of the at least one application from the first operating system.

6. A device having a plurality of operating systems installed therein, the device comprising:
a display configured to display a first user interface according to an execution of a first operating system and display a second user interface according to an execution of a second operating system, wherein the second operating system is different from the first operating system, and further configured to display in the first user interface of the first operating system, a pop-up window displaying identification information of other operating systems installed in the device;

a user interface configured to receive a first user input for selecting an icon of at least one application installed in the first operating system on the first user interface, while the first user interface and the second user interface are displayed, and to receive a second user input, wherein the second user input is an input for dragging the selected icon from the first user interface to a selected position on the second user interface, or an input for dragging the selected icon to an identifier of the second operating system on the pop-up window; and at least one processor configured to:
create a shortcut icon of the at least one application installed in the first operating system, including an identifier representing the first operating system displayed in the shortcut icon, in a format processable in the second operating system without installing the at least one application in the second operating system, in response to receiving the first user input and the second user input, display the created shortcut icon of the at least one application installed in the first operating system on the selected position on the second user interface, when the second user input is the input for dragging the selected icon from the first user interface to the selected position on the second user interface, and display the created shortcut icon of the at least one application installed in the first operating system on a preset position on the second user interface of the second operating system, when the second user input is the input for dragging the selected icon to the identifier of the second operating system on the pop-up window, wherein the user interface is further configured to receive a third user input for selecting the created shortcut icon displayed in the second user interface, wherein the at least one processor is further configured to execute the at least one application installed in the first operating system based on receiving the third user input, and wherein the created shortcut icon includes path information for accessing a position of the at least one application in the first operating system and identification information of the at least one application.

7. The device of claim 6, wherein the at least one processor selects a preset application among the at least one application installed in the first operating system according to the receiving of the first user input and creates a shortcut icon of the selected preset application.

8. The device of claim 6, wherein
the display displays a list including identification information about a plurality of applications installed in the first operating system; and
the at least one processor selects the at least one application among the plurality of applications displayed in the list based on the first user input.

9. The device of claim 6, wherein the at least one processor selects the at least one application according to the receiving of the first user input on the icon of the at least one application displayed on the first user interface.

10. The device of claim 6, wherein the at least one processor removes the shortcut icon from the user interface of the second operating system according to removal of the at least one application from the first operating system.

11. A non-transitory computer-readable recording medium that stores a program that is executed by a computer to perform a method of operating a device having a plurality of operating systems installed therein, the method comprising:

while a first user interface and a second user interface are displayed, wherein the first user interface is displayed according to an execution of a first operating system and the second user interface is displayed according to an execution of a second operating system, and wherein the second operating system is different from the first operating system, receiving a first user input for selecting an icon of at least one application installed in the first operating system on the first user interface;

displaying, in the first user interface of the first operating system, a pop-up window displaying identification information of other operating systems installed in the device;

receiving a second user input, wherein the second user input is an input for dragging the selected icon from the first user interface to a selected position on the second user interface, or an input for dragging the selected icon to an identifier of the second operating system on the pop-up window;

creating a shortcut icon of the at least one application installed in the first operating system, including an identifier representing the first operating system displayed in the shortcut icon, in a format processable in the second operating system without installing the at least one application in the second operating system, in response to receiving the first user input and the second user input;

when the second user input is the input for dragging the selected icon from the first user interface to the selected position on the second user interface, displaying the created shortcut icon of the at least one application installed in the first operating system on the selected position on the second user interface of the second operating system;

when the second user input is the input for dragging the selected icon to the identifier of the second operating system on the pop-up window, displaying the created shortcut icon of the at least one application installed in the first operating system on a preset position on the second user interface of the second operating system;

receiving a third user input for selecting the created shortcut icon displayed on the second user interface; and executing the at least one application installed in the first operating system based on receiving the third user input, wherein the created shortcut icon includes path information for accessing a position of the at least one application in the first operating system and identification information of the at least one application.

* * * * *